Nov. 12, 1957 F. HERZEGH 2,812,583
DEVICE FOR MEASURING VARIATIONS IN TIRE THICKNESS
Filed March 31, 1955 4 Sheets-Sheet 1

INVENTOR.
FRANK HERZEGH
BY C. E. Tripp
ATTY.

Nov. 12, 1957  F. HERZEGH  2,812,583
DEVICE FOR MEASURING VARIATIONS IN TIRE THICKNESS
Filed March 31, 1955  4 Sheets-Sheet 2
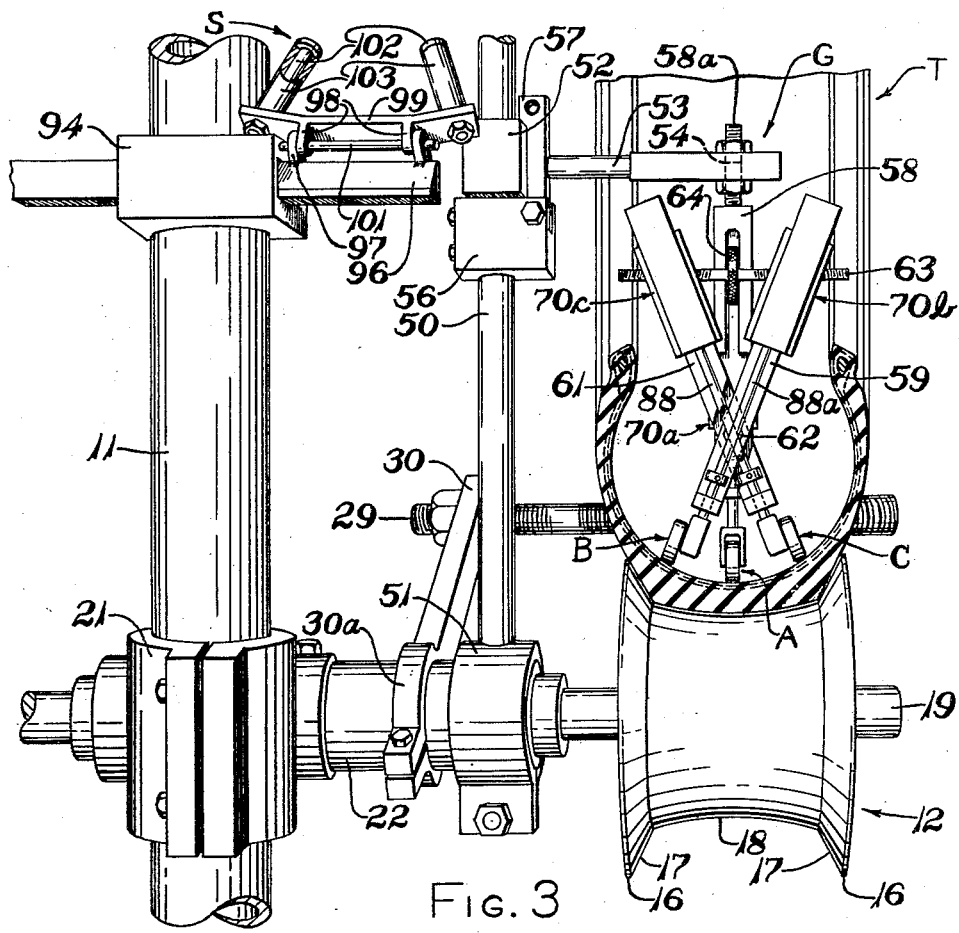
Fig. 3
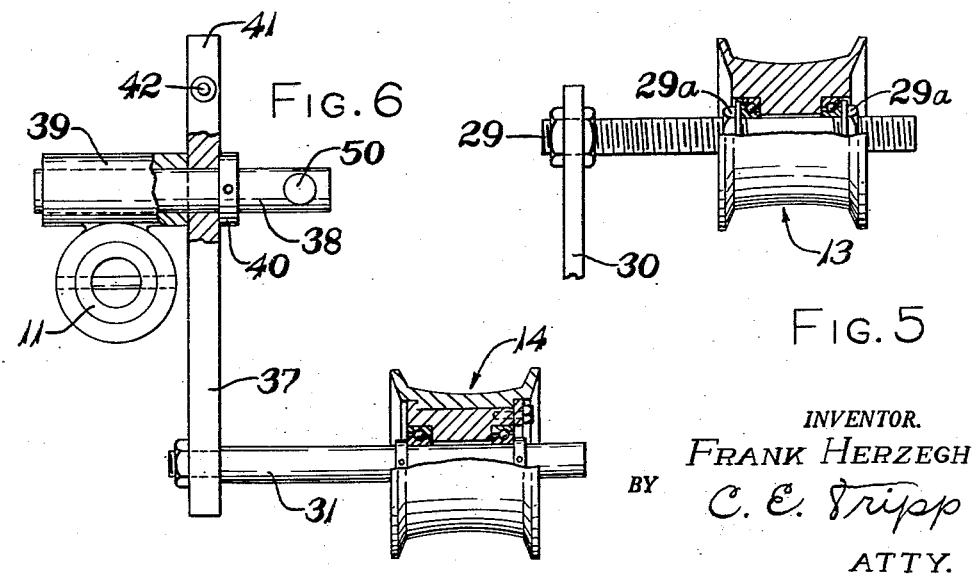
Fig. 6
Fig. 5
INVENTOR.
FRANK HERZEGH
BY C. E. Tripp
ATTY.

Nov. 12, 1957  F. HERZEGH  2,812,583
DEVICE FOR MEASURING VARIATIONS IN TIRE THICKNESS
Filed March 31, 1955  4 Sheets-Sheet 3

INVENTOR.
FRANK HERZEGH
BY C. E. Tripp
ATTY.

Nov. 12, 1957     F. HERZEGH     2,812,583
DEVICE FOR MEASURING VARIATIONS IN TIRE THICKNESS
Filed March 31, 1955     4 Sheets-Sheet 4

INVENTOR.
FRANK HERZEGH
BY C. E. Tripp
ATTY.

United States Patent Office 2,812,583
Patented Nov. 12, 1957

2,812,583

DEVICE FOR MEASURING VARIATIONS IN TIRE THICKNESS

Frank Herzegh, Cleveland, Ohio, assignor to The B. F. Goodrich Company, New York, N. Y., a corporation of New York Application March 31, 1955, Serial No. 498,342

4 Claims. (Cl. 33—147)

This invention relates to a method and apparatus for predicting thump and other undesirable ride characteristics of pneumatic tires as well as for locating the offending parts of tires previously determined to have thump characteristics by other tests.

The problem of thump in pneumatic tires and particularly passenger car tires has become increasingly troublesome. The problem has received much attention throughout the tire industry but due to the method of tooling in the tire industry any changes in tire building techniques are expensive and can only be made when it is ascertained that such changes will improve the tire or greatly reduce its thump characteristics. It has been found that tire balancing devices do not give critical information and, of course, it is well known that merely balancing the tire and wheel statically and dynamically does not necessarily improve thump characteristics.

I have found that variations in thickness of the tread portion of the tire, that is, the crown and shoulder portions, have a direct relation to the thump characteristics of the tire. Under this invention I am able to precisely determine the scope of variations in such thicknesses. I have further found that the magnitude of the thickness variations is not the only consideration but that the rate of change of thickness is quite important in the effect on the performance of the tire. Under my invention I am able not only to precisely gauge the variations at the crown and shoulder portions of the tire tread area but can accurately use the data for a quick evaluation of the rate of change of the measured thickness. The records made by my apparatus can be placed side by side or one above the other on a single sheet of paper giving a 360° picture of the thickness of the crown and shoulder portions of the tread.

In the preferred embodiment of my invention I employ three presser feet in the form of small ball bearing rollers which engage the inside of the uninflated tire directly over a large roller that engages the tire externally and accurately supports the tire relative to the frame of the machine. The tire is rotated and variations in tread thickness cause movement of the presser feet, such motion being recorded against tire rotation, as on three strips of uniformly moving paper. One of the presser feet engages the tire interior at the crown area of the tread and the other two at the opposite shoulder (side) areas so that this arrangement finds, measures, locates, and records variations in tire thickness. I found with this apparatus that I can detect poorly made tread rubber and other splices and predict the thump and ride characteristics of a tire. I can also find the source of the difficulty in tires known to produce thump or the like from other tests such as ride tests. The manner in which these advantages may be obtained will be apparent to one skilled in the art from the following detailed description of the invention.

In the drawings:

Fig. 3 is a fragmentary view with a tire in section showing the preferred disposition of the presser feet;

Fig. 5 is a similar view showing the mounting of the lower tire guide roller;

Fig. 6 shows details of the upper tire guide roller which also serves to press the tire against the lower rollers;

General construction

Figure 1:
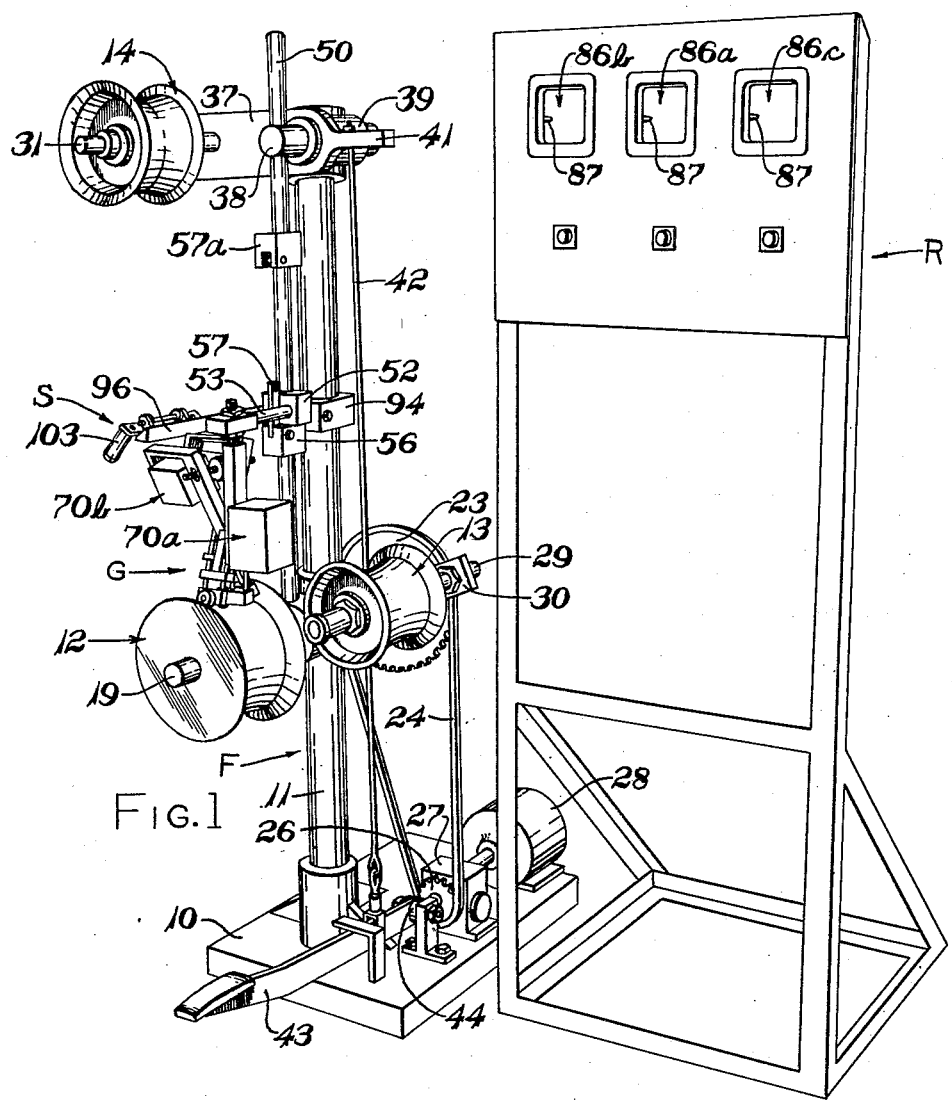
Fig. 1 is a three-quarter perspective view of the front or operator's side of the entire machine.
Figure 2:
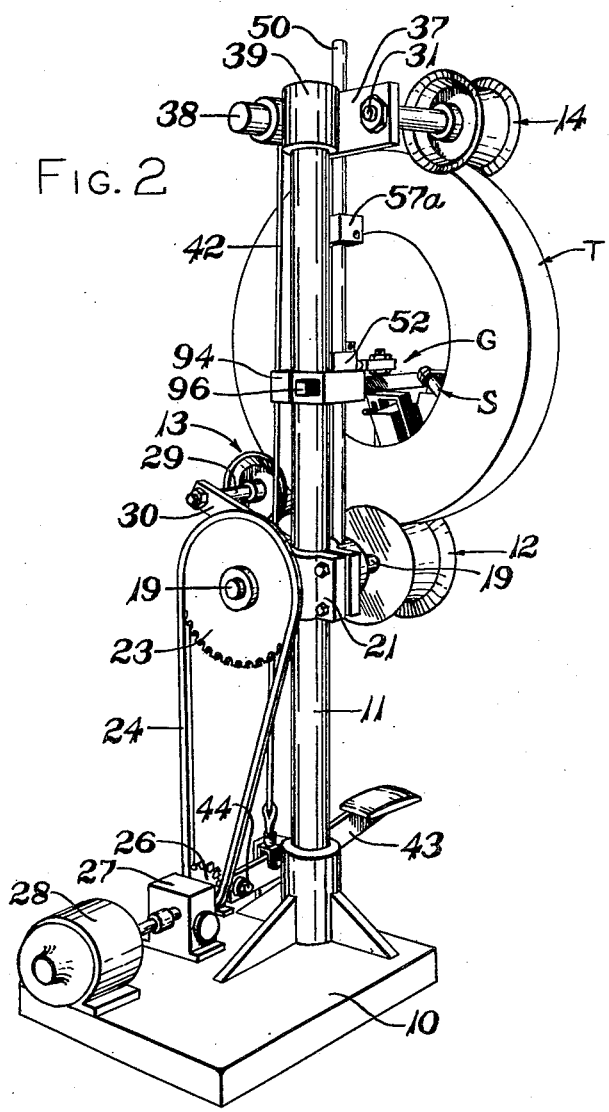
Fig. 2 is a three-quarter rear side view of the machine.

The general construction of the machine appears in Figs. 1 to 3. The machine includes a frame F having a base 10 and upright pedestal 11. The tire locating and supporting roller 12 is the lowermost roller. Adjacent thereto is a lower guide roller 13 for steadying the tire, and near the top of the machine is an upper guide roller 14 which is weighted to urge the tire tread against the main locating roller 12. The measuring or gauging mechanism is indicated at G and is best seen in Fig. 3 with the presser feet or rollers A, B and C resting on a tire T, the tire being sectioned for clarity only. A bead spreader and steadier assembly S, best seen in Fig. 3, is arranged to spread the beads slightly during the measuring operation. The bead steadier is shown in its retracted position in Fig. 3, for clarity, but it can be seen in place in Fig. 2. Referring to Fig. 1 a recording panel R can be seen which includes the means for sensing and amplifying the measurements made by the gauging devices, and recording such measurements on moving strips of paper. A motor is provided to rotate the tire during the measurement operation.

Detailed construction

As seen in Fig. 3 the tire locating roller has side flange portions 16 for engaging the side shoulder portions of the tire tread carefully contoured as at 17 to fit the sideshoulder portions of the tread and merging with a carefully contoured drum-like portion 18 for engaging the crown portion of the tread.

Figure 4:
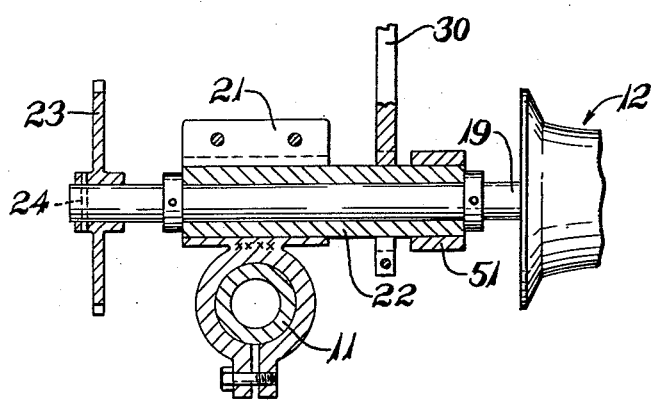
Fig. 4 is a partial section showing the mounting of the tire locating roller.

As seen in Figs. 3 and 4 the locating roller 12 is fixed on a shaft 19 which is mounted in a bracket 21 clamped to the pedestal 11. A sleeve 22 is integral with bracket 21 and rotatably supports the shaft 19. Referring to Fig. 2, the roller 12 is turned by a sprocket 23 fixed to roller shaft 19, chain 24, small sprocket 26, speed reducer 27 and motor 28. I have found that a gear reduction chosen to rotate the tire at approximately 2 R. P. M. works satisfactorily.

As seen in Figs. 3 and 5 the lower guide roller 13 is adjustably mounted on a threaded shaft 29 by means of clamp nuts 29a and turns on conventional ball bearing assemblies. The other end of the shaft is attached to an arm 30 clamped as at 30a, Fig. 3, to the sleeve 22 that also supports the shaft 19 for tire locating roller 12.

The mounting of the upper guide roller 14 is shown in Figs. 1, 2 and 6. The roller is rotatably retained on a shaft 31 attached to an arm 37 pivotally retained on a stub shaft 38 that is fixed to a bracket 39 mounted on the upper end of the pedestal 11 by pins or the like. The arm 37 is pivotally mounted on stub shaft 38 so that weighted roller 14 can press against the tire and it is axially retained on its shaft by a collar 40 and has an extension lever 41 to which is attached a cable 42 (see Fig. 2) leading to a foot pedal 43 pivoted at 44 to a bracket extending from the base of the frame. When it is desired to insert or remove a tire, roller 14 can be lifted clear by depressing the foot pedal.

The gauging mechanism

Figure 7:
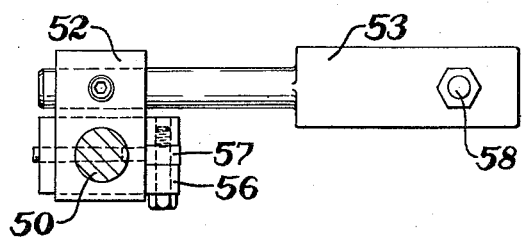
Fig. 7 is a plan view showing details of the mounting of the gauge mechanism.
Figure 9:
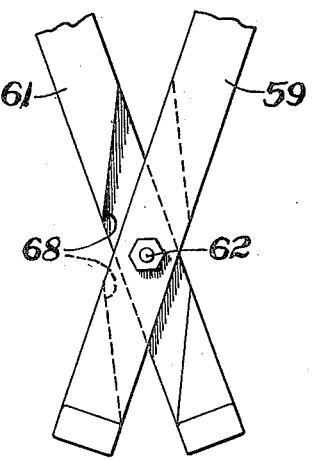
Fig. 9 is a partial view showing the scissor mounting of the shoulder measuring support bars.
Figure 8:
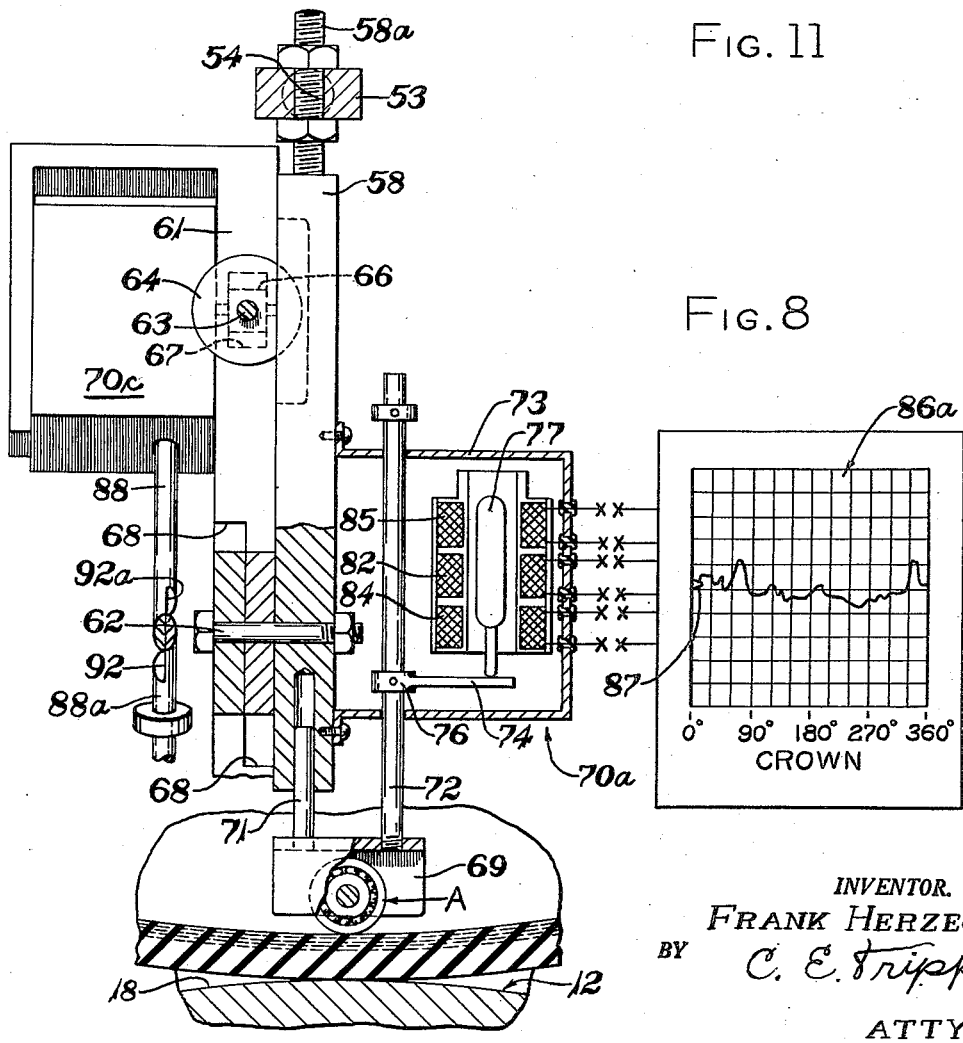
Fig. 8 is a fragmentary side view showing the crown measuring mechanism with other parts removed.

In the form of the invention shown, the gauging mechanism includes three rollers (presser feet) slidably mounted on crossed bars with means for sensing motion of the rollers as the tire is rotated. As seen in Fig. 3, in order to adjustably support this structure a vertical rod 50 is welded to a clamping collar 51 that is clamped to the same arm extension 22 that supports axle shaft 19 of the tire locating roller 12. Slidable on rod 50 is a block 52 and as seen in Figs. 3 and 7, an arm 53 extends from the block, the end of the arm being bored as at 54 to mount the gauging mechanism. A lower stop block 56 is pinned to the vertical rod 50 and acts as a lower vertical stop for the sensitive elements during the measuring operation. A key 57 extends vertically from sliding block 52 and fits in a slot in the pinned block 56 to prevent rotation of the assembly during measurement. The two blocks 52 and 56 may be clamped together temporarily during the test. An upper support block 57a is slotted to receive the upper end of key 57 when the gauging mechanism is lifted clear, and a pin can be inserted through the upper block and the key to retain the gauging mechanism in its upper position. The gauging mechanism includes three crossed bars 58, 59 and 61, seen in Fig. 3. Bar 58 is the support for the other bars of the assembly and has a threaded extension 58a mounted by means of opposed nuts in the bore 54 of the lateral arm 53. Side bars 59 and 61 are crossed and pivotally mounted as at 62 on the vertical bar 58. As seen in Figs. 3 and 8, the angular position of the crossed bars is adjusted by a right and left hand screw 63 operated by a knurled thumb wheel 64. As seen in Fig. 8, the screw is threaded into trunnion blocks 66 received in slots 67 in each of the crossed side bars. The crossed side bars are relieved as at 68 (Figs. 8 and 9) so that they lie in the same plane and have the desired range of scissor motion.

There are three rollers for engaging the tire. Roller A is mounted on the vertical bar 58 and measures variations in thickness at the crown of the tread. Rollers B and C are mounted on bars 59 and 61 respectively, and give information concerning the shoulder areas of the tread. As seen in Fig. 8 crown roller A is mounted in a channelled block 69 from which extends a guide pin 71 sliding in a vertical bore in bar 58 and from which extends a second guide pin 72, the latter also serving to actuate the electric sensing means 70a mounted on bar 58. In the form of the invention described, the sensing means is an instrument referred to as a differential transformer. The transformer is mounted in a housing 73 and is actuated by an arm 74 extending from a collar 76 on the rod 72. The arm 74 shifts the armature 77 of the control transformer in response to variations in tread thickness. The weight of the mechanism is sufficient to insure that the motion of the pin 72 is followed by the transformer armature. The transformer armature is surrounded by a mid-winding 82 upon which is impressed an alternating current. This induces current in the control windings 84 and 85, the voltage induced depending upon the position of the armature relative to the control windings. The transformer windings are connected to an amplifier and recorder unit which translates changes of the motion of the armature in terms of corresponding induced voltages in the control windings into a curve drawn on a moving strip paper 86a by means of a pin 87 that moves (vertically in this case) in correspondence with variations in tread thickness.

Figure 10:
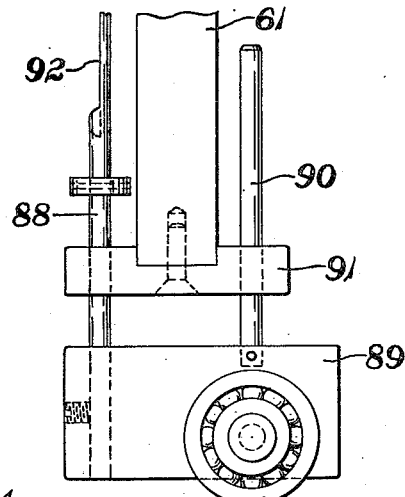
Fig. 10 is a detail view showing the mounting of the rollers forming the presser feet at the shoulders.

Similar transformers 70b and 70c are mounted on crossed bars 59 and 61 respectively. The latter transformers are actuated by guide pins 88 and 88a and since the roller mounting for the bars 59 and 61 are the same, only that for bar 61 will be described, as shown in Fig. 10. Pin 88 connects to a block 89 to which is mounted the roller B and the block is prevented from turning by a guide pin 90 slidably extending through a plate 91 attached to the lower end of bar 61. The long rod 88 also extends through lower plate 91. The rods are oppositely notched as at 92 and 92a (Fig. 8) so that the rods may move in the same plane. The arrangement of the rollers shown in Fig. 10 is such that rollers B and C are in substantial circumferential alignment with the central roller A. By loosening the clamp bolt 62 shown in Fig. 8 the construction just described permits selected crown zones of the tire to be engaged by the side rollers, and also provides for adjustment for various sizes of tires.

The bead steadying device

The bead steadying device S is shown lifted and in its retracted position in Fig. 3 and can be seen in place but partially hidden in Fig. 2. It is mounted on a block 94 fastened to the pedestal 11 which block receives a squared bar 96 that slides in a square hole in the block 94. Referring to Fig. 3, at one end of the bar 96 a pair of ears 97 forms a hinge with another pair of ears 98 mounted on a cross piece 99 and the ears are hinged by a pin 101. Extending angularly from the cross piece 99 are a pair of pins 102 which receive rollers 103. When the device is in use the bar is brought out until the rollers can be placed between the tire beads and the vertical position of block 94 is adjusted so that the desired amount of bead spreading and steadying action is obtained. This completes the detailed description of the construction of the apparatus.

Operation

Figure 11:
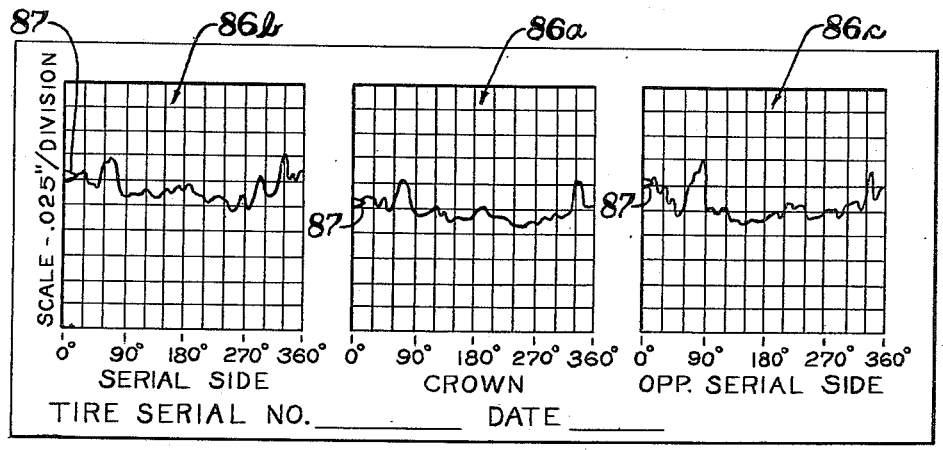
Fig. 11 shows an example of the type of record made possible with this invention.

The operation of the apparatus will be apparent from the preceding description but will be briefly described. The gauging device will have previously been held in its uppermost position by the key on sliding block 52 and upper block 57a. The spreader mechanism will have been retracted. The foot pedal 43 is depressed thereby lifting the upper guide roller 14 enough to permit a tire to be placed against the locating roller 12 and the lower guide roller 13. The foot pedal is now released whereupon the weighted roller 14 engages the tire, presssing it firmly against the locating roller 12 and steadying the upper side of the tire. The gauging mechanism is now released and brought down until the block 52 rests on the lower stop block 56 with which the rollers A, B and C will be pressed by gravity against the tire. The position of stop block 56, the nuts on extension 58a of bar 58, the transformer actuating arms, and the other parts of the gauging mechanism is such that this represents a measurement somewhat near the expected main thickness of the tread at crown and shoulders. The spreader mechanism S is slid out and dropped and the device is now ready for the measuring step. A circumferential starting point is selected for the tire, either mold marks thereon or by making a chalk mark on the tire and the tire rotating motor and recording motor are started. When the selected starting point passes under the rollers the recorders are energized. Rotation continues at a speed of about 2 R. P. M. for one turn whereupon the measurement has been completed and the motor and recorders are stopped. The curves obtained from the three recorders are identified and may be placed one above the other or side by side on a log sheet as seen in Fig. 11. I found that I can detect variations in tire tread thickness in the order of five thousandths of an inch with an ease and consistency heretofore unobtainable by any apparatus known to me. I have also found that I can run measurements on a series of tires and obtain their curves, mix them up and remeasure them, and the second set of curves will be so consistent with the first set that I can identify the tires from comparing the two sets of curves.

An important advantage of the results of this invention is that it gives a visual record of the physical nature of the tread from shoulder to shoulder which can be interpreted virtually at a glance. Another important example is that the curves obtained by the method employed in using this apparatus gives a ready visual indication of the rate of change of thickness and this is found to be very significant. It is proven to be one of the best means for predicting or evaluating tire thump and harsh ride that I have seen employed. Usually the major variations in the three curves will be found to occur at the same position on each curve, which is helpful in determining the cause of the variation, such as tread splice, liner splice, etc. I have further found that results predicted from curves made with this method and apparatus correlate with other tests, both road tests and laboratory tests employing a large heavy drum that rotates the tires held against it. This again is an important advantage because the measurement tests made under this invention can be made and evaluated more quickly with simpler apparatus and less highly skilled operators than with other devices of which I am aware. Furthermore, since the evaluation is quite objective, no experience or subjective judgment is required, and precise results are produced after a very limited experience is had with the machine.

As an example of the usefulness of this device, I have been consistently able to locate tread and liner splices from the curves in cases where the splices were unsatisfactory, and experience has shown that the tread splice in particular is the worst offender in the thump problem. Since this apparatus is so easy to use and requires such a short time for its cycle, thousands of tires can be checked in which the tread splices have been marked during the molding operation, and thus it becomes possible to decide definitely, for example, whether or not the factory tread splice technique need be changed. As explained previously, any such change in the production line of a major tire manufacturer is exceedingly expensive so that this relatively simple apparatus makes it possible to insure that no such expensive change is made unless the change is necessary.

Although I have shown three sensing rollers and have found the results to be satisfactory, in the broader aspects of the invention I may use more rollers or fewer rollers depending on the nature of the investigation being conducted.

Since the recording aspect plays such an important part in the evaluation of the tire I prefer that a visual record be made but in a simpler form the apparatus itself can be operated by substituting dial gauges or the like for the control transformers. However, this makes the device more of a laboratory device than a production device, but indicates the versatility of the apparatus.

It is pointed out that since the gauging mechanism G is supported through rod 50 by the same extension 22 that supports the locating roller 12, flexing in the apparatus does not affect the accuracy of the readings of the instruments.

Having completed a detailed description of a preferred embodiment of the invention so that others skilled in the art may practise the same, I claim:

1. Apparatus for evaluating the thump characteristics of an uninflated torroidal tire having spaced beads comprising a frame, tire tread supporting roller means on said frame, said roller means comprsing a midportion for positioning the tire tread radially and side flanges for positioning the tire axially, tire guide means spaced from said roller means, a plurality of presser feet movably supported on said frame, means for urging one presser foot toward said roller means and against the inside of the tire carcass in the crown area of the tread, means for urging other presser feet against the inside of the tire carcass at the shoulder regions of the tread, means to rotate the tire, and means for measuring changes in position of said presser feet as the tire is rotated.

2. Apparatus for evaluating the thump characteristics of an uninflated torroidal tire having spaced beads comprising a frame, tire tread supporting roller means on said frame, said roller means comprising a midportion for positioning the tire tread radially and side flanges for positioning the tire axially, tire guide means spaced from said roller means, a plurality of presser feet movably supported on said frame, means for urging one presser foot toward said roller means and against the inside of the tire carcass in the crown area of the tread, means for urging other presser feet against the inside of the tire carcass at the shoulder regions of the tread, said presser feet being substantially in circumferential alignment, means to rotate the tire, and means for measuring changes in position of said presser feet as the tire is rotated.

3. Apparatus for evaluating the thump characteristics of an uninflated torroidal tire having spaced beads comprising a frame including a vertical post, an arm extending from said post, tire tread supporting roller means mounted on said arm, said roller means comprising a midportion for positioning the tire tread radially and side flanges for positioning the tire axially, tire guide means mounted on said post and spaced from said roller means, a presser foot movably supported on said arm, means for urging said presser foot toward said roller means and against the inside of the tire carcass in the crown area of the tread, means to rotate the tire, and means for measuring changes in position of said presser foot as the tire is rotated.

4. The method of evaluating the thump characteristics of a torroidal pneumatic tire having spaced beads comprising the steps of measuring the radial thickness of the tread at the crown and at least one shoulder progressively about the circumference of the tire and determining the rate of change of such thickness from the measurements.

References Cited in the file of this patent

UNITED STATES PATENTS

| | | |
|---|---|---|
| 1,319,361 | Rouanet | Oct. 24, 1919 |
| 2,030,237 | Brittain | Feb. 11, 1936 |
| 2,583,791 | Neff | Jan. 29, 1952 |
| 2,618,971 | Herzegh | Nov. 25, 1952 |
| 2,689,407 | Beyer | Sept. 21, 1954 |
| 2,695,520 | Karsai | Nov. 30, 1954 |